United States Patent [19]

Keller et al.

[11] Patent Number: 4,475,565

[45] Date of Patent: Oct. 9, 1984

[54] MAGNETICALLY ACTUABLE SHOCK RESPONSIVE UNIT

[75] Inventors: William F. Keller, West Covina; Richard D. Sibley, Anaheim, both of Calif.

[73] Assignee: Koso International, Inc., Sante Fe Springs, Calif.

[21] Appl. No.: 381,329

[22] Filed: May 24, 1982

[51] Int. Cl.³ .............................................. F16K 17/36
[52] U.S. Cl. ........................................ 137/39; 251/68
[58] Field of Search ............................. 137/39; 251/68

[56] References Cited

U.S. PATENT DOCUMENTS

| | | | |
|---|---|---|---|
| 2,637,331 | 5/1953 | Sullivan | 137/39 |
| 4,185,507 | 1/1980 | Domyan | 74/2 |
| 4,207,912 | 6/1980 | Ichikawa | 137/39 |
| 4,261,379 | 4/1981 | Berry | 137/39 |

Primary Examiner—Robert G. Nilson
Attorney, Agent, or Firm—William P. Green

[57] ABSTRACT

Apparatus including a weight formed at least partially of magnetic material and positioned on a support and adapted to be displaced horizontally relative to the support by earthquake or other shock forces, mechanism operable upon such shock induced horizontal displacement of the weight relative to the support to actuate a valve or other controlled device, and means near and essentially opposite the weight acting to produce a magnetic field applying a force magnetically to the weight displacing it horizontally relative to the support in a relation actuating the controlled device without subjection to shock forces.

13 Claims, 5 Drawing Figures

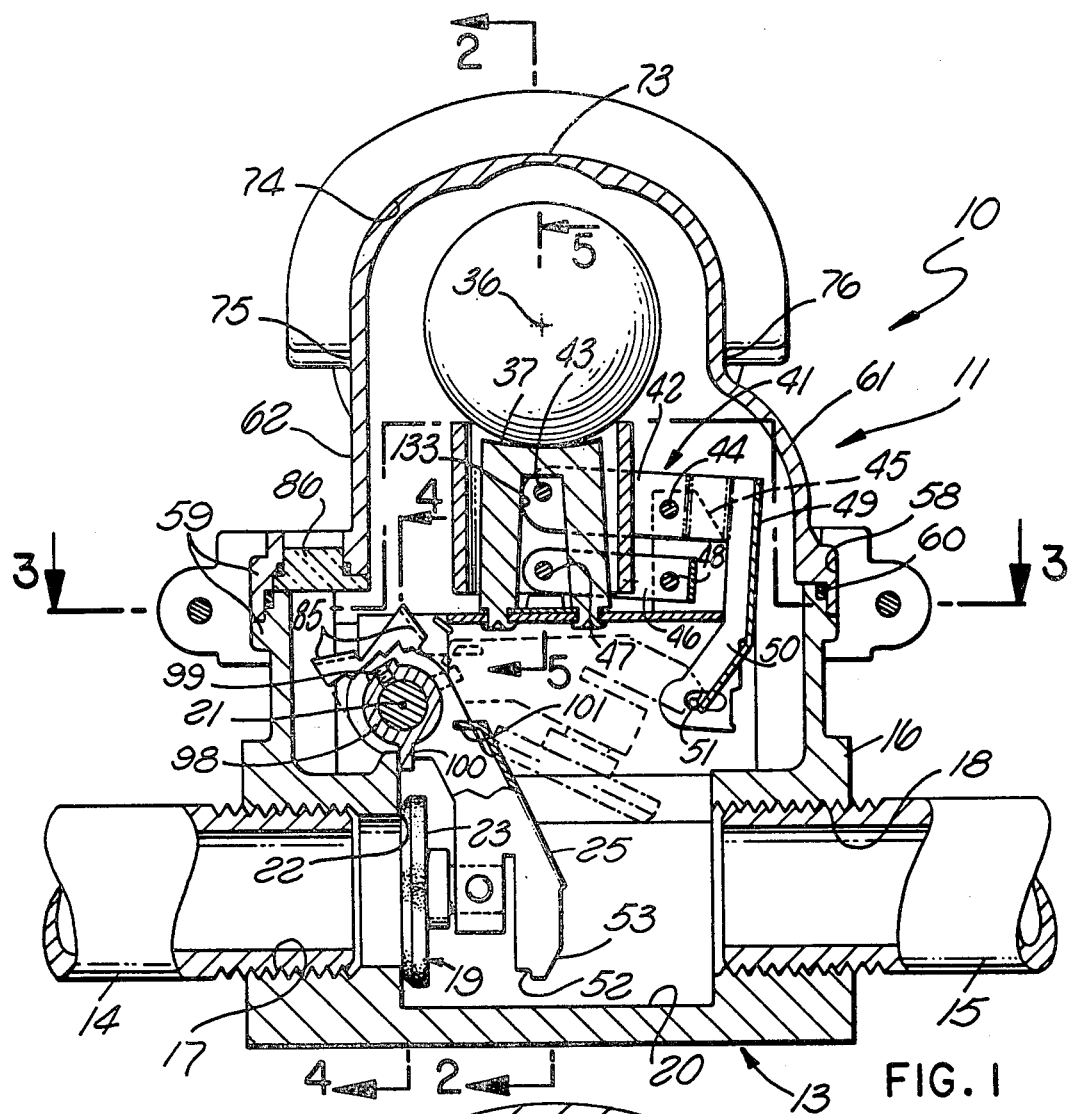
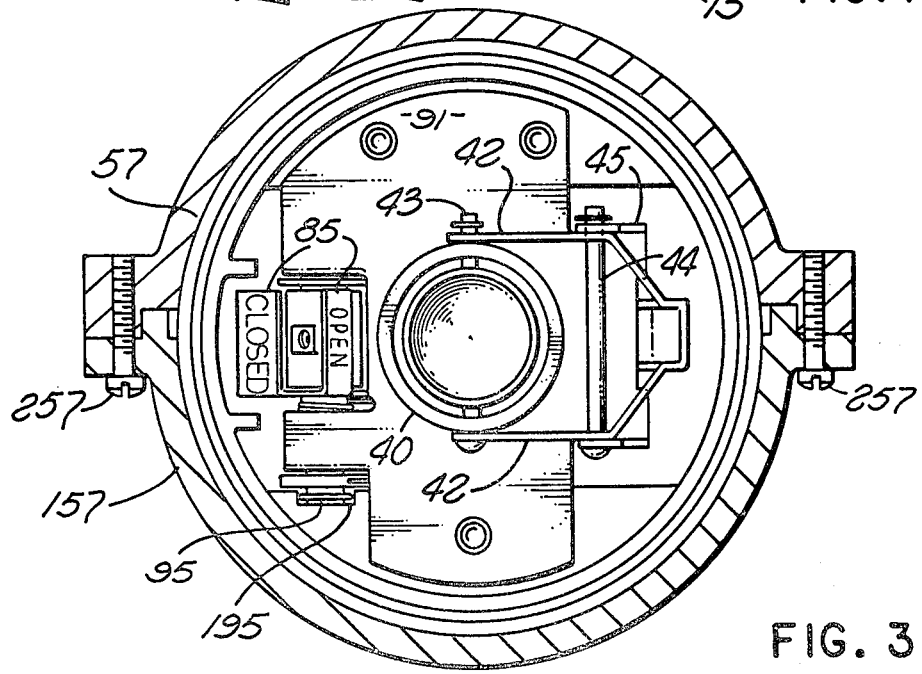
FIG. 1
FIG. 3

4,475,565

MAGNETICALLY ACTUABLE SHOCK RESPONSIVE UNIT

BACKGROUND OF THE INVENTION

This invention relates to improved inertia actuated shock responsive devices for automatically operating a controlled unit upon subjection of the device to shock forces of predetermined intensity, such as for example the forces encountered in an earthquake, explosion, or the like. The invention will be described primarily as utilized for operating a valve as the controlled unit, typically for the purpose of closing off the delivery of gas in a pipe line in the event of an earthquake, but may also be applied to actuation of other types of controlled units, such as an electric switch.

Certain types of shock responsive actuators have been provided in the past, including for example the device disclosed in U.S. Pat. No. 4,185,507 issued Jan. 29, 1980 to Frank F. Domyan. These prior devices have in common the fact that they include an inertia actuated weight mounted in association with a coacting structure which moves relative to the weight upon subjection to seismic or other shock forces, with the weight resisting displacement with the structure by virtue of its inertia. The relative movement between that structure and the weight is then utilized to effect actuation of the controlled valve or other unit. In the apparatus of the above identified patent and in other prior arrangements, the weight and other moving parts of the device are contained within a housing which forms a portion of the structure movable relative to the weight, with the housing being sealed and its interior being in communication with the gas pipe line.

SUMMARY OF THE INVENTION

The purpose of the present invention is to provide auxiliary actuating means for operating a shock responsive device of the above discussed type when desired without subjection of the device to the shock forces normally required for its operation. An auxiliary actuator embodying the invention can be operated by a control element either at the location of the shock responsive device or at a remote location. In addition, the apparatus of the present invention is designed to enable such auxiliary actuation without requiring direct contact of the auxiliary operating unit with the inertia actuated mass or other moving parts of the device, and without locating the auxiliary actuator within the sealed interior of a housing containing such moving parts.

To achieve these results, the present invention operates the controlled unit by forming a part of the actuating mechanism of magnetic material, and providing means for producing a magnetic field at a location to actuate that part of the mechanism magnetically to close the valve or attain another desired purpose. The portion of the mechanism which is thus operated magnetically is preferably the previously discussed inertia actuated weight, which is formed at least in part of magnetic material and is located in a position of exposure to the operating magnetic field. Desirably, the inertia actuated weight and the means for producing the magnetic field are located at opposite sides of a wall which is formed of non-magnetic material enabling passage of the magnetic field through that wall and to the weight. The non-magnetic wall may be a portion of a wall containing the inertia operated weight and other moving parts of the shock responsive device, so that the means for producing the magnetic field do not contact and are not exposed to any gas or other material contained within the housing. The unit for producing the magnetic field may be an electromagnet including a coil disposed about or associated with a core which extends into sufficiently close proximity to the wall of the housing and the relatively movable weight to attract the weight toward the housing wall when the electromagnet is energized, and thus move the weight to a position causing operation of the valve or other controlled unit.

BRIEF DESCRIPTION OF THE DRAWINGS

The above and other features and objects of the invention will be better understood from the following detailed description of the typical embodiment illustrated in the accompanying drawings, in which:

FIG. 1 is an axial sectional view through a valve for controlling the flow of gas or other fluid and including an actuator embodying the invention;

FIG. 3 is a horizontal section taken on line 3—3 of FIG. 1; and

DESCRIPTION OF THE PREFERRED EMBODIMENT

Figure 2:
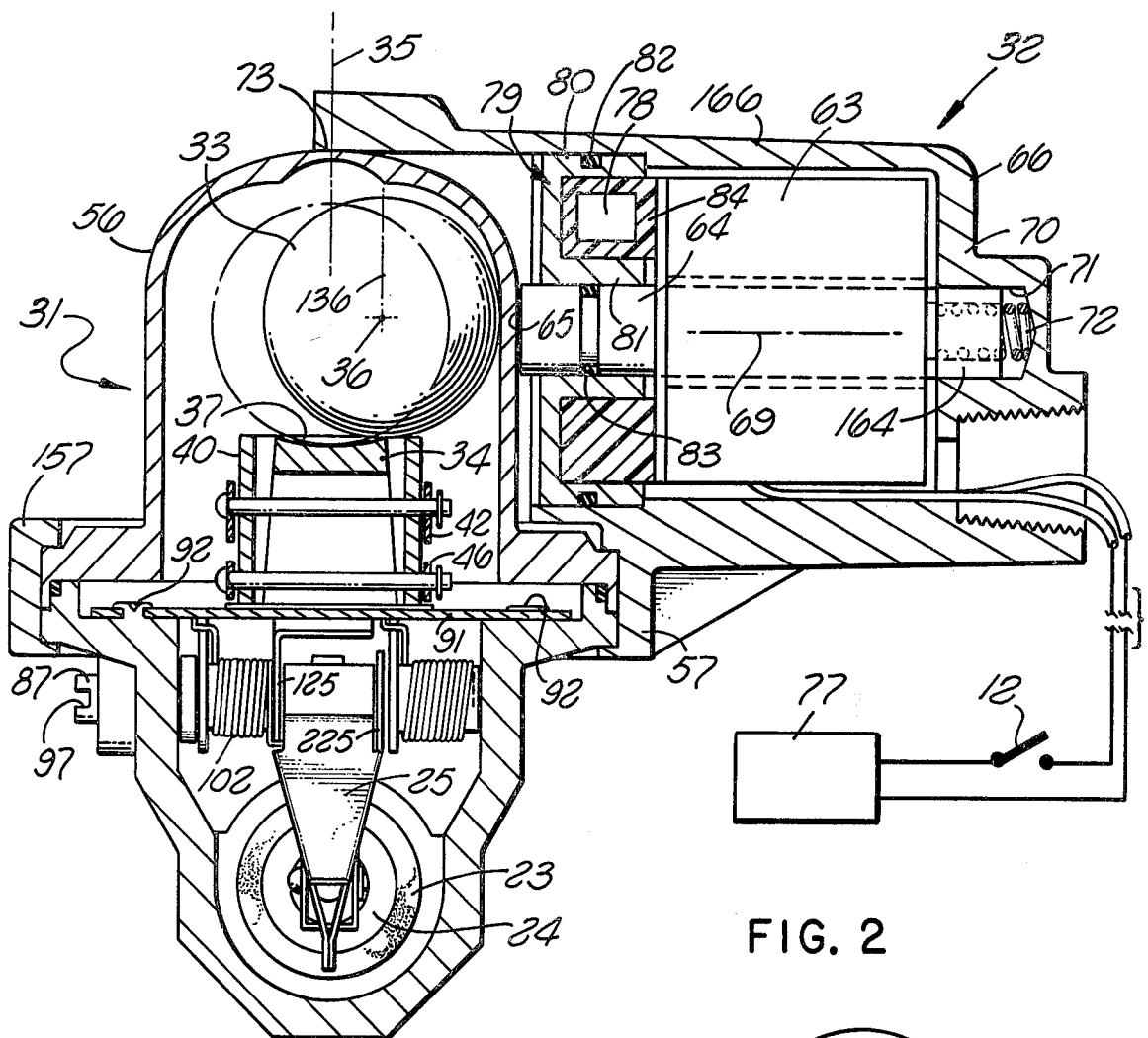
FIG. 2 is a vertical transverse section taken on line 2—2 of FIG. 1.

The device 10 illustrated in the drawings includes an actuator 11 responsive to seismic or other shock forces, and also responsive to manual or other actuation of a control switch 12, to actuate a controlled unit 13 between two different conditions. The controlled unit is preferably a valve operable when released to the full line position of FIG. 1 to close off the delivery of natural gas or another fluid from an inlet line 14 to an outlet line 15.

The valve 13 may include a hollow body 16 having aligned threaded inlet and outlet openings 17 and 18 into which the inlet and outlet lines 14 and 15 are threadedly connectible. A circular valve element 19 is mounted within the inner chamber 20 in valve body 16 for swinging movement about an axis 21 between an open position illustrated in broken lines in FIG. 1 and a closed position (full lines in FIG. 1) of annular engagement with a circular seat 22 formed in the valve body. Valve element 19 may include a circular sealing part 23 of rubber or other elastomeric material carried by a rigid metal part 24 attached to an arm 25 which mounts the valve element for its swinging movement. Arm 25 may be stamped of sheet metal deformed to the illustrated configuration and having two spaced portions 125 and 225 at its upper end containing aligned openings 26 through which a mounting shaft 27 carried by body 16 extends to mount arm 25 and valve element 19 for the discussed pivotal movement. Two indicator tabs 85 carried by and projecting from portion 125 of arm 25 may have the markings "open" and "closed" formed thereon, and visible from the outside of the housing through a sealed transparent window 86, to indicate to an operator the open or closed condition of the valve. The shaft may function as a reset mechanism, and for this purpose may be mounted to be turned about axis 21 by a short extension shaft 87 aligned with shaft 27 and engaging it at 88 in a relation transmitting rotation between the parts. Shaft 27 may be mounted for rotation by reception within aligned bearing openings 89 in two spaced vertical members 90 which may be formed as downwardly turned portions of a horizontal plate 91 attached rigidly to the valve body 16 as by upset rivet lugs 92 formed by that body. The shaft extension 87 may be journalled within a passage 93 formed in the side wall of body 16, and be sealed with respect thereto by a rubber O-ring 94, and be retained against axial withdrawal from body 16 by a hairpin type spring clip 95 which is slidably insertable into a passage 195 in body 16 to a position of reception within an annular groove 96 in shaft 87. A screwdriver slot 97 in the outer end of shaft 87 enables that shaft and the connected main shaft 27 to be turned about axis 21 to reset the valve.

A tubular part 98 disposed about shaft 27 at its center (see FIG. 1) is fixed to the shaft by a set screw 99 and has a lug 100 engageable with a shoulder 101 formed as a portion of arm 25 in a relation forming a lost motion connection between shaft 27 and arm 25 by which the shaft can swing the arm and carried valve in a counterclockwise direction as viewed in FIG. 1.

Figure 4:
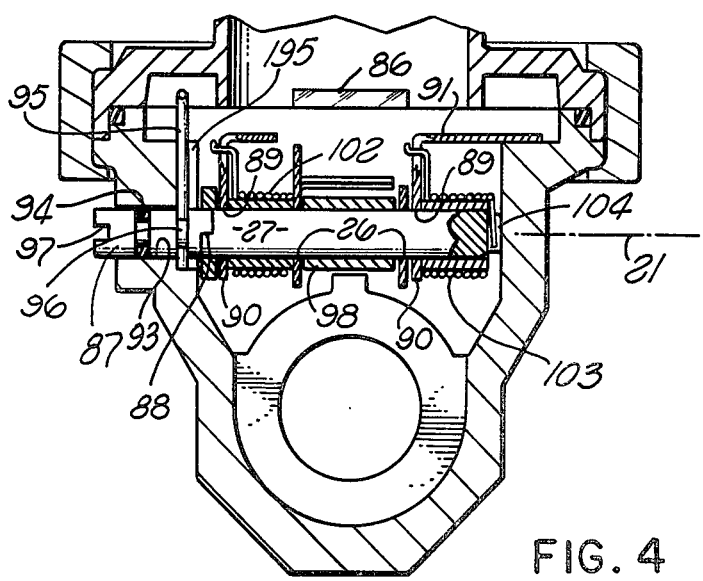
FIGS. 4 and 5 are fragmentary vertical sections on lines 4—4 and 5—5 of FIG. 1.
Figure 5:
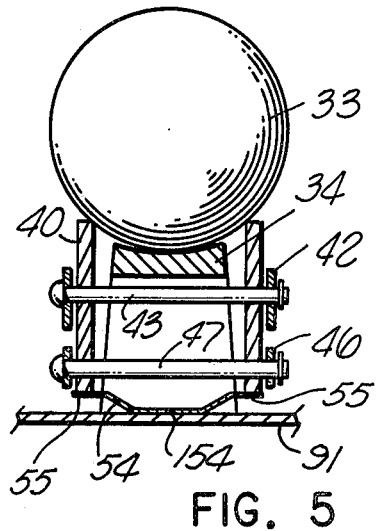

Arm 25 is yieldingly pivotally urged, in a clockwise direction as viewed in FIG. 1 and to the full line closed-valve position of that figure, by a coil spring 102 (FIG. 4) disposed about the shaft and having its opposite ends engaged with the arm and with one of the portions 90 of plate 91. A second coil spring 103 about the shaft has its ends engaged with a shoulder on shaft 27 at 104 and with the second portion 90 of plate 91 to urge the shafts 27 and 87 and part 98 in a clockwise direction as viewed in FIG. 1 and to the FIG. 1 full line position of part 98.

The actuator 11 includes a shock responsive inertia actuated assembly 31 which is similar to the device illustrated in U.S. Pat. No. 4,185,507, and includes also an auxiliary actuator 32 which can release the valve without subjection to shock forces. The shock responsive assembly 31 includes a weight or mass 33 which is formed at least partially and preferably entirely of magnetic metal, desirably steel, and which may take the form of a solid sphere of such material. When valve element 19 is open, the sphere or ball 33 is supported on a pedestal 34 extending upwardly along a vertical axis 35, with the center 36 of the ball located on that axis. The pedestal may be externally cylindrical about axis 35, and contain an upwardly facing shallow circular recess 37 at its upper end centered about axis 35 and of a depth and contour to normally retain ball 33 in its centered position. The ball is displaceable from that position relative to the pedestal, as to the full line position of FIG. 2, by shock induced movement of the pedestal relative to the ball, during which movement the inertia of the weight resists movement thereof with the pedestal. The lower end of the pedestal 34 may be attached rigidly to the previously mentioned horizontal base plate 91 secured to the valve body 16.

A vertical tube 40 centered about axis 35 is disposed about and spaced from pedestal 33, and is movable upwardly and downwardly relative to the pedestal between the FIG. 1 and FIG. 2 positions. The tube may be mounted for this vertical movement by a parallelogram mechanism 41, including two similar parallel upper links 42 each pivoted at one end to the tube by a horizontal pin 43 extending through a vertical slot 133 in pedestal 33, and each pivoted by a second parallel horizontal pin 44 to a pair of vertical bracket arms 45 projecting upwardly from plate 91. The parallelogram mechanism also includes two similar parallel lower links 46 each pivoted by a first pin 47 to the tube and by a second pin 48 to the bracket arms 45. The two upper links 42 may be stamped integrally from a single piece of sheet metal, forming a cross piece 49 at the right ends of the links as seen in FIG. 1, and forming two spaced parallel vertical side walls 50 lying in the planes of the two links 42 and projecting downwardly therefrom and carrying a cross pin 51 which acts to engage and latch the valve element 19. For engagement with this latching cross pin 51, the valve mounting arm 25 contains a notch or recess 52 within which pin 51 is received in the open FIG. 1 broken line position of the valve to retain the valve against closing movement. A cam surface 53 formed on arm 25 deflects pin 51 upon upward swinging movement of the arm in a manner allowing the arm to pass the pin and permit movement of the pin into its latched position within notch 52. As will be understood, downward movement of tube 40 causes rightward swinging movement of cross pin 51 to release the valve for closing movement. The tube is yieldingly urged upwardly in any appropriate manner, as by provision of a leaf spring or plate spring 54 secured at a central location 154 by welding or otherwise to plate 91 and having end portions 55 urged upwardly and applying yielding upward force to tube 40 at diametrically opposite locations. When weight 33 is moved laterally in any horizontal direction relative to pedestal 34, as to the full line position of FIG. 2, the weight engages tube 40 and displaces it downwardly to the FIG. 2 position to move pin 51 out of notch 52 in arm 25 and allow closure of the valve element by spring 102. Such lateral displacement of the weight is limited by engagement of the weight with a dome shaped housing 56 which is attached to and projects upwardly from valve body 16, and which is symmetrical with respect to axis 35 except at the location of an enlargement or bulge 61 at its right side as viewed in FIG. 1. This housing 56 is detachably secured to the valve body by an annular clamp assembly typically formed of two semicircular sections 57 and 157 (FIG. 3), secured together at their opposite ends by screws 257, with this clamp assembly containing an annular groove or recess 58 receiving annular flanges 59 of parts 16, 57 and 157 to secure them tightly together and in annular sealing engagement with a rubber O-ring or other gasket 60. Except at the location of the enlargement or bulge 61, the side wall 62 of housing 56 may extend directly vertically, so that the portion of the side wall which is contacted by the ball in any of its various possible horizontally actuated positions is directly vertical. When the ball is in any such laterally displaced position of engagement with side wall 62 of housing 56, the ball is in contact with the upper edge of tube 40 in a relation actuating it downwardly by the weight of the ball and relative to pedestal 34 and the housing and valve body. In this condition (for example the full line position of FIG. 2), the point of contact of tube 40 with the underside of the ball is beyond the vertical central axis of the ball in a direction outwardly away from axis 35 (that is, to the right of axis 136 extending vertically through the center 36 of the ball in FIG. 2), so that upon cessation of the shock forces or other forces which displace the ball, the upward force applied to the ball by tube 40 will be at a location causing the ball to be cammed inwardly to its original centered position on the pedestal. The ball thus automatically resets itself to the FIG. 1 centered position when permitted to do so.

In order to magnetically displace the ball to its FIG. 2 position, auxiliary actuator 32 includes a solenoid coil 63 extending about a magnetic metal core 64 whose extremity 65 is received in contact with the outer surface of side wall 62 of housing 56. This housing 56 is formed of a non-magnetic material, such as aluminum, to pass the magnetic field from core 64 inwardly through housing side wall 62 and to ball 33, to attract it rightwardly to the FIG. 2 position when the solenoid is energized. The solenoid and core are contained within an auxiliary actuator housing 66, which is formed of magnetic metal to define a return path for the magnetic flux. Housing 66 is appropriately secured to valve body 16 and non-magnetic housing part 56, as by forming housing 66 integrally with one of the semicircular halves 57 of the clamping assembly 57-157-257 (see FIG. 1).

The magnetic metal core part 64 of the solenoid may be centered about an axis 69 extending perpendicular to and intersecting vertical axis 35 at the center 36 of weight 33 when the weight is in its FIG. 1 normal position. Housing 66 has an end wall 70 containing a cylindrical recess 71 within which the right end 164 of core 64 is received. A coil spring 72 contained within that recess may yieldingly urge the core part 64 leftwardly as viewed in FIG. 2 and against the outer surface of housing 56 to assure reception of the transverse and surface 65 of the core in as closely proximate relation to the weight as is possible. Extending leftwardly from its transverse end wall 70, the magnetic metal housing 66 has a wall 166 extending about coil 63 and shaped at its left end as viewed in FIG. 2 to extend about the upper portion of non-magnetic housing 56. More particularly, the left end of housing 66 as viewed in FIG. 2 is in direct contact with the uppermost central portion of dome shaped housing 56 at the location 73. This point of contact is also represented at 73 in FIG. 1. Extending leftwardly and rightwardly from that location 73 as seen in FIG. 1, the magnetic metal housing 66 has a surface 74 which curves downwardly at both sides of housing 56 to locations 75 and 76 somewhat lower than the level of the center 36 of weight 33. This surface 74 extending downwardly from the location 73 to points 75 and 76 thus forms a portion of the magnetic metal housing 66 which is in relatively close proximity to weight 33, so that the lines of flux can pass inwardly from core 64 to weight 33 and then back to portion 74 of housing 66 for return through that housing to the core.

Power may be supplied to the solenoid from a power source represented diagrammatically at 77 in FIG. 2 through the manually actuated switch 12, which may be at a remote location with respect to the device 10, with the power source being either alternating current or direct current as is most convenient. If an alternating current power source is utilized, typically one hundred and twenty volts A.C., this power may be rectified and reduced to a desired voltage within the device 10 by a solid state rectifying unit represented at 78 in FIG. 2. This rectifier and the solenoid coil 63 are preferably hermetically sealed within housing 66, desirably by positioning the solid state circuit element 78 within an annular part 79 of U-shaped cross-section as illustrated, disposed about core rod 64 and having its parallel axially extending cylindrical outer and inner walls 80 and 81 sealed with respect to housing 66 and core 64 by two rubber O-rings 82 and 83. The annular seals formed at the locations of these two O-rings thus prevent flow of gases, moisture, or other fluids rightwardly past element 79 and to the solenoid or to circuitry 78. Preferably, circuitry 78 is encapsulated within and protected by a resinous plastic material 84 which fills the annular space within part 79 except the portion of that space occupied by circuit element or elements 78 and is solidified in place to permanently protect the solid state parts.

In placing the device illustrated at 10 in the figures in use, the valve body and carried parts are attached to inlet and outlet lines 14 and 15 in a position in which axis 35 of the device extends directly vertically, so that ball 33 can normally be received within the shallow recess 37 of pedestal 34 and will be retained by gravity in its centered position in that recess. With the ball thus located in its FIG. 1 full line position, valve element 19 is set to its open position by swinging the valve element in a counterclockwise direction as viewed in FIG. 1 and to the broken line position of that figure. This setting of the valve element may be effected by inserting a screwdriver into slot 97 of shaft 87 (FIG. 4) and turning that shaft and the connected shaft 27 and part 98, against the tendency of spring 103, from the FIG. 1 full line position of part 98 to its broken line position of that figure. During the initial portion of this counterclockwise movement of part 98, the lug 100 of that part swings toward shoulder 101 of valve carrying arm 25, without movement of that arm. After lug 100 contacts shoulder 101, continued movement of the shafts and part 98 acts to swing arm 25 and the valve toward the broken line open-valve position of FIG. 1. In approaching that position, cam surface 53 on valve arm 25 engages pin 51, and deflects that pin slightly to enable it to ultimately move into notch 52 and be retained in that notch by spring 54 in a manner holding the valve open. In the event of an earthquake, explosion, or other occurrence applying shock forces to the device, these forces will function to rapidly displace the valve body, housing 56, pedestal 34, tube 40, and all of the other associated parts horizontally, while the ball 33 tends to resist such movement by virtue of its very substantial inertia, with the result that the ball moves relative to the housing parts and other elements to a laterally offset position such as the full line position of FIG. 2. The ball in moving laterally away from axis 35 contacts and displaces downwardly the tube 40, causing arm 50 and pin 51 to swing to a position releasing the valve for closing movement to the full line position of FIG. 1 under the influence of spring 102. Upon cessation of the actuating force, the ball automatically returns to its centered position as previously discussed, leaving the valve closed but permitting it to be reset to open condition in the manner previously discussed.

If it is desired to actuate the valve to closed condition manually, an operator closes switch 12 at a remote location (or in the vicinity of device 10 if desired), energizing solenoid coil 63 to produce a flow of magnetic lines of force through core 64 and housing 66 and through weight 33 causing the weight to be attracted rightwardly in FIG. 2 to the full line position of that figure resulting in release of the valve for closing movement by virtue of downward displacement of tube 40. The non-magnetic housing 56 of the inertia actuated assembly does not interfere with this magnetic field. Further, the left end of the core and the portions 73-74 of housing 66 extend into close enough proximity to magnetic metal weight 33 to actuate the ball as discussed, with the gaps between the ball and these magnetic metal elements being short enough to avoid interference with that actuation.

While a certain specific embodiment of the present invention has been disclosed as typical, the invention is of course not limited to this particular form, but rather is applicable broadly to all such variations as fall within the scope of the appended claims.

We claim:

1. The combination comprising:
a valve having a body containing a passage through which fluid flows and a valve element movable relative to said body between a closed position blocking said fluid flow and an open position permitting such flow;
a weight;
a housing connected to said valve body and containing a chamber within which said weight is movably received and which chamber communicates with said passage in the valve body;
a pedestal projecting upwardly within said housing and having a shallow recess at its upper end in which said weight is normally received and from which the weight is displaceable laterally by shock forces;
an element disposed about said pedestal and displaceable downwardly relative thereto by the weight upon said shock induced lateral displacement of the weight relative to the pedestal;
mechanism responsive to said downward movement of said element disposed about the pedestal to release said valve element for closing movement;
said housing having a wall of non-magnetic material; and
means located at an outer side of said wall at a location to produce a magnetic field passing through the wall and to said weight at an inner side thereof and to magnetically displace the weight relative to the housing in a relation closing said valve element without subjection to said shock forces.

2. The combination as recited in claim 1, in which said means include an electromagnet controllably energizeable to produce said magnetic field for displacing the weight.

3. The combination as recited in claim 1, in which said non-magnetic wall of said housing has an upper portion forming a rounded dome, there being a second housing at a side of said first mentioned housing containing said means which produce the magnetic field and having a curved edge extending about the upper side of said dome and curved essentially in correspondence therewith.

4. The combination as recited in claim 3, in which said means include a solenoid contained within said second housing at a side of the first housing, and a core of magnetic material within the solenoid.

5. The combination comprising:
a shock responsive unit including a weight and a structure displaceable relative to the weight by shock forces, said unit being responsive to shock induced relative displacement of said structure and said weight to actuate a controlled device; and
means for producing a magnetic field at a location to magnetically displace said weight relative to said structure and thereby actuate said controlled device without subjection to said shock forces;
said structure including a housing disposed about said weight and having a wall formed of non-magnetic material;
said means including an electromagnetic coil at the outside of said housing wall, a core of magnetic metal within said coil and forming part of a flux path for directing flux toward said weight, and spring means yieldingly urging said core toward said wall and weight and relative to said coil to minimize the gap between the core and weight.

6. The combination as recited in claim 5, including said controlled device as an element of the claim.

7. The combination as recited in claim 5, including said controlled device as an element of the claim, said device being a fluid flow controlling valve actuable by said unit in response to shock forces.

8. The combination as recited in claim 5, in which said structure includes a support in said housing on which said weight is normally located and relative to which the weight is displaced laterally by said shock forces, there being mechanism responsive to said lateral displacement of the weight to actuate said controlled device.

9. The combination comprising:
a weight formed at least partially of magnetic material;
a support having an upper surface on which the weight is normally supported and relative to which the weight is displaceable horizontally by shock forces;
mechanism operable upon shock induced horizontal displacement of said weight relative to said support to actuate a controlled device; and
means located near and essentially horizontally opposite said weight and operable to produce a magnetic field acting to apply a force magnetically to the magnetic material of said weight displacing it horizontally relative to said support and from said normal position thereon in a relation causing said mechanism to actuate said controlled device without subjection to said shock forces.

10. The combination as recited in claim 9, in which said means include an electromagnet horizontally opposite said weight and controllably energizable to produce said magnetic field for displacing the weight.

11. The combination as recited in claim 9, including a generally vertically extending wall interposed horizontally between said weight and said means for producing a magnetic field and formed of a material through which flux may pass between said means and weight to move the latter horizontally.

12. The combination as recited in claim 9, including as an element of the claim said controlled device actuable by said mechanism.

13. The combination as recited in claim 9, including said controlled device as an element of the claim, said device being a fluid flow controlling valve actuable by said mechanism in response to shock forces.

* * * * *